UNITED STATES PATENT OFFICE.

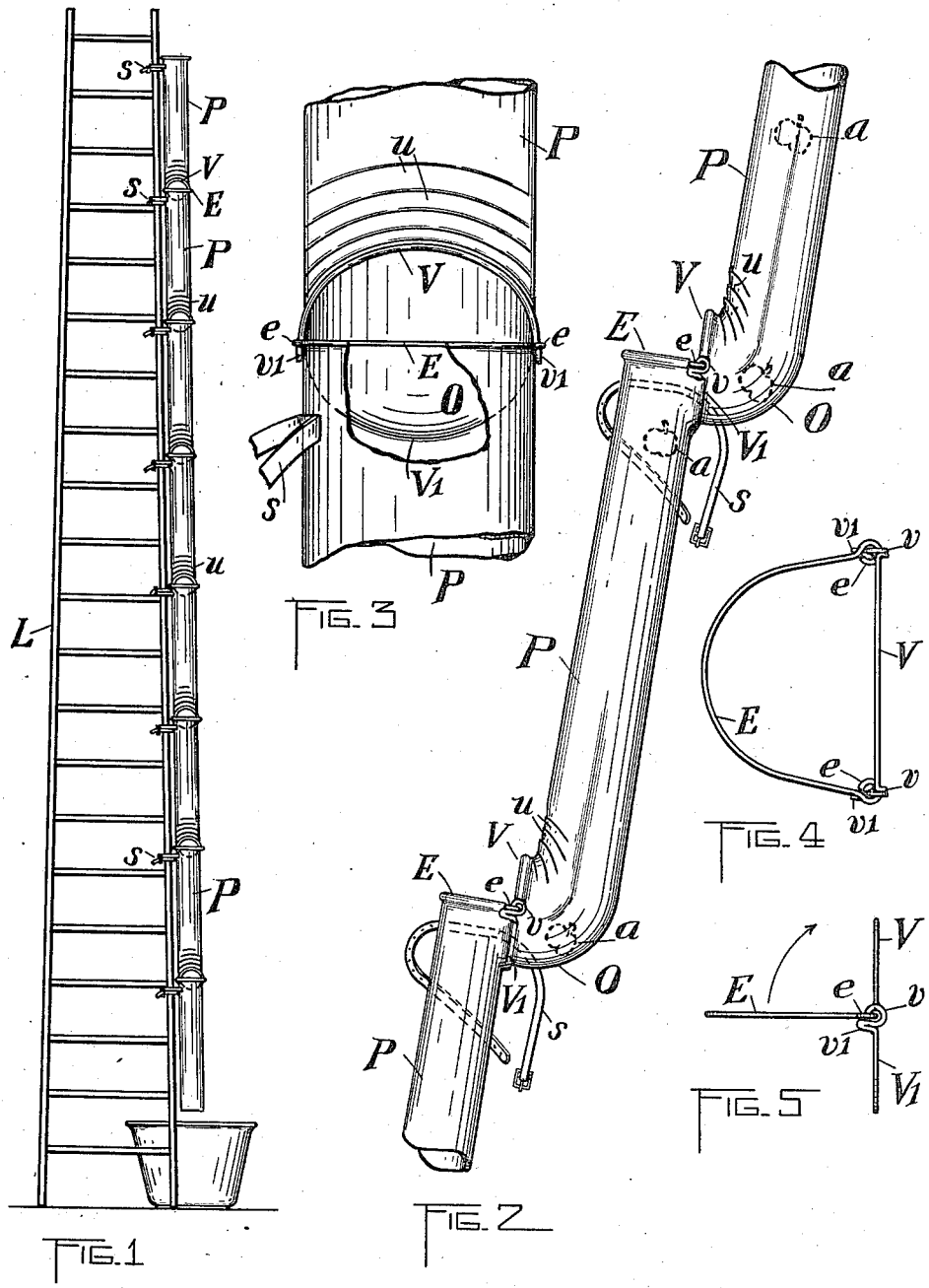

JOSEPH B. ST. HELENS, OF ROCHESTER, NEW YORK.

FRUIT-CHUTE.

1,011,261. Specification of Letters Patent. Patented Dec. 12, 1911.

Application filed October 10, 1910. Serial No. 586,313.

*To all whom it may concern:*

Be it known that I, JOSEPH B. ST. HELENS, a citizen of the United States, and a resident of Rochester, in the county of Monroe and State of New York, have invented a new and Improved Fruit-Chute.

This invention relates to an improved device to aid fruit pickers in gathering fruit from trees.

The object of my present invention is to provide a tubular structure adapted to use as a chute in which the fruit may be inserted at any desired elevation from the ground and which is adapted to convey the fruit to the ground or to a suitable receptacle thereon and which is also adapted to prevent marring of the fruit in its descent, from the point where it is inserted, to the ground or to the receptacle.

My invention comprises a series of similar tubular sections so connected together as to effect the discharge of the fruit therethrough from one into the next one beneath it and each section being adapted to arrest the fruit, without marring it, in its fall therethrough and to discharge it into the next succeeding section thus limiting the total fall of the fruit to the length of a section.

The accompanying drawings illustrating a preferred embodiment of my invention are as follows:—

Figure 1 shows the device as attached to a ladder. Fig. 2 is an enlarged side view of one of the sections with a part of the next sections above and below. Fig. 3 is an enlarged face view of the upper and lower part of two adjoining sections with a part of the lower section broken away to show more clearly the internal arrangement of the parts. Fig. 4 is a plan view and Fig. 5 a side view of the pivotally connected jaw or flap holding members.

Similar parts are designated by similar reference characters throughout the several figures of the drawings.

Referring to the drawings. L is a ladder to the right stile of which there is connected, by means of straps $s$, a device made in accordance with my invention and comprising the similar sections P, the upper end of each of which, as seen, is secured to the lower end of the next section above it through the medium of the pivoted members seen in Figs. 4 and 5, one of which comprises a nearly circular or ring like structure formed of upper and lower portions V and $V^1$ respectively between which are formed eyes $v$ and in these eyes $v$ are inserted the eyes $e$ formed at the ends of the semicircular member E. Part of the upper end of each section P is hemmed around one of the wire members E and a part also of the upper end of each such section P is hemmed together with a part of the bottom end of the next section above it around the lower portion $V^1$ of the circular member while the remaining part of the lower end of each section P is hemmed around the upper part V of the circular member.

Just beneath each of the eyes $v$ there is formed an offset $v^1$ as indicated in Fig. 5 operating to hold the member E in a horizontal position while permitting such member to be swung upwardly for the purpose hereinafter to be described.

The lower end of each tubular section has gathers or plaits formed therein as seen at $u$ to cause the parts to normally assume the positions indicated in the drawings, being such that an article of fruit, as indicated at $a$, in falling through each section is arrested by the curved or elbow like formation O at the bottom thereof and is discharged thereby, after the fall of the fruit has been broken, into the upper end of the next section below it. Of these sections P there may be any desired number connected end to end in the manner indicated and described and they may be secured to a ladder as indicated or the upper end of the device may be strapped around the shoulder of a person picking the fruit from the ladder or in the tree and the articles of fruit as picked may be inserted into the upper end of the upper section or into the upper end of any of the sections accessible to the person picking the fruit. The upper end of the upper section P may be hemmed around a plain ring formed of wire.

Owing to the fact that the members E may be swung upwardly it will be readily seen that the device may be folded to lie nearly flat and rolled up to occupy a comparatively small space for storage or transportation.

It is believed from the foregoing description of the construction of my device that the operation of the several parts and the method of using the same is sufficiently clear to call for no further explanation herein.

What I claim is:

1. A device of the character described comprising a series of similar tubular sections connected end to end in overlapping relation each section opening upwardly at its upper end to receive an article of fruit and also opening laterally at its upper end to receive an article of fruit from the section above it, each section having also an elbow or curve formed at its lower end operating to arrest the fruit and discharge the same laterally therefrom into the upper end of the section below it.

2. A device of the character described comprising a series of similar tubular sections connected end to end in overlapping relation and adapted to occupy positions with the axes of their main portions in substantially parallel lines in the same plane each section opening upwardly at its upper end to receive an article of fruit and also opening laterally at its upper end to receive an article of fruit from the section above it, each section having also an elbow or curve formed at its lower end operating to arrest the fruit and discharge the same laterally therefrom into the upper end of the section below it.

3. A device of the character described comprising a series of similar tubular sections connected end to end in overlapping relation each section opening upwardly at its upper end to receive an article of fruit and also opening laterally at its upper end to receive an article of fruit from the section above it, each section having also an elbow or curve formed at its lower end operating to arrest the fruit and discharge the same laterally therefrom into the upper end of the section below it and a reinforcing band for holding adjacent sections in relatively operative positions secured to the bottom of each section and to the overlapping portion of the upper end of the section below it.

4. A device of the character described comprising a series of similar tubular sections connected end to end in overlapping relation each section opening upwardly at its upper end to receive an article of fruit and also opening laterally at its upper end to receive an article of fruit from the section above it, each section having also an elbow or curve formed at its lower end operating to arrest the fruit and discharge the same laterally therefrom into the upper end of the section below it and a U shaped reinforcing member secured to the upper end of each section to keep the upper end in opened position.

5. A device of the character described comprising a series of similar tubular sections connected end to end in overlapping relation each section opening upwardly at its upper end to receive an article of fruit and also opening laterally at its upper end to receive an article of fruit from the section above it, each section having also an elbow or curve formed at its lower end operating to arrest the fruit and discharge the same laterally therefrom into the upper end of the section below it and a reinforcing band for holding adjacent sections in relatively operative positions secured to the bottom of each section and to the overlapping portion of the upper end of the section below it and a U-shaped reinforcing member secured to the upper end of each section to keep the upper end in opened position and pivoted to the band and a stop for supporting the U shaped member in opened position relative to the band whereby the upper end of such section is held opened outwardly to receive the fruit.

6. A device of the character described comprising a series of similar tubular sections connected end to end in overlapping relation and adapted to occupy positions with the axes of their main portions in substantially parallel lines in the same plane each section opening upwardly at its upper end to receive an article of fruit and also opening laterally at its upper end to receive an article of fruit from the section above it, each section having also an elbow or curve formed at its lower end operating to arrest the fruit and discharge the same laterally therefrom into the upper end of the section below it and a reinforcing band for holding adjacent sections in relatively operative positions secured to the bottom of each section and to the overlapping portion of the upper end of the section below it.

7. A device of the character described comprising a series of similar tubular sections connected end to end in overlapping relation and adapted to occupy positions with the axes of their main portions in substantially parallel lines in the same plane each section opening upwardly at its upper end to receive an article of fruit and also opening laterally at its upper end to receive an article of fruit from the section above it, each section having also an elbow or curve formed at its lower end operating to arrest the fruit and discharge the same laterally therefrom into the upper end of the section below it and a U shaped reinforcing member secured to the upper end of each section to keep the upper end in opened position.

8. A device of the character described comprising a series of similar tubular sections connected end to end in overlapping relation and adapted to occupy positions with the axes of their main portions in substantially parallel lines in the same plane each section opening upwardly at its upper end to receive an article of fruit and also opening laterally at its upper end to receive an article of fruit from the section above it, each section having also an elbow or curve formed at its lower end operating to arrest the fruit and discharge the same laterally therefrom into the upper end of the section below it; a reinforcing band for holding adjacent sections in relatively operative positions secured to the bottom of each section and to the overlapping portion of the upper end of the section below it and a U shaped reinforcing member secured to the upper end of each section to keep the upper end in opened position and pivoted to the band and a stop for supporting the U shaped member in opened position relative to the band whereby the upper end of such section is held opened outwardly to receive the fruit.

9. A device of the character described comprising a series of similar tubular sections connected end to end in overlapping relation each section opening upwardly at its upper end to receive an article of fruit and also opening laterally at its upper end to receive an article of fruit from the section above it and with the lower end of each section plaited or gathered to conform the same to arrest the fall of an article of fruit and discharge the same into the upper end of the next succeeding section below it.

10. A device of the character described comprising a series of similar tubular sections connected end to end in overlapping relation and adapted to occupy positions with the axes of their main portions in substantially parallel lines in the same plane each section opening upwardly at its upper end to receive an article of fruit and also opening laterally at its upper end to receive an article of fruit from the section above it and with the lower end of each section plaited or gathered to conform the same to arrest the fall of an article of fruit and discharge the same into the upper end of the next succeeding section below it.

11. A device of the character described comprising a series of similar tubular sections connected end to end each section opening upwardly at its upper end to receive an article of fruit and also opening laterally at its upper end to receive an article of fruit from the section above it and with the lower end of each section plaited or gathered to conform the same to arrest the fall of an article of fruit and discharge the same into the upper end of the next succeeding section below it.

JOSEPH B. ST. HELENS.

Witnesses:
 MARTHA M. NELSON,
 OSBORNE F. GURNEY.

Copies of this patent may be obtained for five cents each, by addressing the "Commissioner of Patents, Washington, D. C."